(12) United States Patent
Pehkonen et al.

(10) Patent No.: US 7,306,776 B2
(45) Date of Patent: Dec. 11, 2007

(54) METHOD AND AN APPARATUS FOR PROCESSING FLUE GAS SCRUBBER MATERIAL FLOWS

(75) Inventors: Oiva Pehkonen, Ylöjärvi (FI); Tarja Korhonen, Ylöjärvi (FI); Pertti Oittinen, Västilä (FI); Markku Helin, Tampere (FI)

(73) Assignee: Metso Power Oy, Tampere (FI)

( * ) Notice: Subject to any disclaimer, the term of this patent is extended or adjusted under 35 U.S.C. 154(b) by 294 days.

(21) Appl. No.: 10/528,407

(22) PCT Filed: Sep. 17, 2003

(86) PCT No.: PCT/FI03/00676

§ 371 (c)(1),
(2), (4) Date: Mar. 18, 2005

(87) PCT Pub. No.: WO2004/028666

PCT Pub. Date: Apr. 8, 2004

(65) Prior Publication Data

US 2005/0271569 A1 Dec. 8, 2005

(30) Foreign Application Priority Data

Sep. 24, 2002 (FI) .................................. 20021704

(51) Int. Cl.
*B01D 53/50* (2006.01)
*B01J 19/00* (2006.01)
*C01F 11/46* (2006.01)

(52) U.S. Cl. ............... 423/243.08; 423/555; 422/129; 422/168; 422/187; 261/DIG. 26; 210/542; 137/170.1

(58) Field of Classification Search ........... 423/243.08, 423/555; 422/129, 168, 187; 261/DIG. 26; 210/542; 137/170.1
See application file for complete search history.

(56) References Cited

U.S. PATENT DOCUMENTS 6,656,440 B2 * 12/2003 Takashina et al. ...... 423/243.08
6,939,523 B2 * 9/2005 D'Alesandro .......... 423/243.08

FOREIGN PATENT DOCUMENTS

| DE | 33 31 993 A1 | * | 3/1984 |
| EP | 0 965 379 A1 | | 1/1999 |
| WO | WO 87/05530 | | 9/1987 |

* cited by examiner

*Primary Examiner*—Timothy C. Vanoy
(74) *Attorney, Agent, or Firm*—Venable LLP; Eric J. Franklin

(57) ABSTRACT

A method for processing flue gas scrubber material flows. The flue gas is scrubbed with a calcium-based absorbent containing washing fluid for absorbing sulphur oxides from the flue gases, and the formed gypsum slurry is directed from the flue gas scrubber to the separator. At the separating point of the separator, gypsum is separated from the washing fluid and the gypsum and washing fluid are taken out of the separator as separate material flows. From the flue gas scrubber the washing fluid is directed to a tank located before the separating point of the separator or after the separating point of the separator, in which tank foam is separated from the washing fluid as its own phase and taken out of the tank.

18 Claims, 5 Drawing Sheets

METHOD AND AN APPARATUS FOR PROCESSING FLUE GAS SCRUBBER MATERIAL FLOWS

FIELD OF THE INVENTION

The invention relates to a method and an apparatus for processing flue gas scrubber material flows.

BACKGROUND OF THE INVENTION

In power plants, flue gases derived from fuel contain impurities, which are often oxides of sulphur ($SO_x$) because of the sulphur compounds contained in the fuel. These flue gases are cleaned with a gas scrubber, i.e. an absorber, wherein the sulphur dioxide is removed with the washing fluid by using an absorbent in the washing fluid, which absorbent reacts with sulphur dioxide. Limestone-based scrubbers are based on that the sulphur oxides coming with the flue gases react with calcium carbonate and form calcium sulphite, which oxidizes to calcium sulphate (gypsum) under the influence of the oxygen contained in the flue gases and forced oxidation. After this the gypsum can be separated from the fluid and the fluid can be recycled back to the scrubber.

Limestone scrubbers are advantageous to use because of their low operating costs (cheap absorbent). However, problems have been caused by the detection of foaming and cumulation of the foam in the limestone scrubber in diesel power plants and in other power plants. With the flue gases in a diesel power plant come lubricants and soot, which together with the bubbles of the oxidation air easily form foam onto the fluid surface of the scrubber. Also, the quality of the water used in the washing fluid has an effect on foaming. Because of the recycling of the washing fluid, foam also continuously circulates back to the scrubber, because it does not exit via the hydrocyclone, which is used in separating gypsum from the washing fluid. Because of this, the amount of foam on the fluid surface of the scrubber increases.

In power industry, it is possible to use a conventional solution for the problem of foaming: the use of anti-foam agent. However, anti-foam agents cause the problem that they may disturb scrubbing process. In addition, their dosage must be continuous and they increase the operating costs of the scrubber. On the other hand, the removal of foam from the scrubber by adjusting the running sequence is difficult because of the floatability of the foam.

SUMMARY OF THE INVENTION

It is an aim of the invention to eliminate the above-mentioned drawbacks and to present a method, wherein it is possible to control foaming without specific anti-foam chemicals.

In the method according to the invention, foam is removed from the washing fluid after the scrubber in a special tank. This can be performed in a tank located after the separating point in a separator known as such, for example in the excess tank of a hydrocyclone, where the washing fluid separated from the gypsum is directed to. Another possibility is to remove foam in the recycle tank before the separator. In the tank, the foam separates as its own phase onto the surface of the fluid and it can be removed from the fluid circulation with physical methods without chemicals. One way is to remove the foam as overflow via an overflow point on an appropriate level. In addition, it is possible to utilize air or water sprays to remove foam from the fluid surface in the tank.

In addition, it is possible to arrange anti-flow structures in the tank in order to improve the separation of water and foam. The substantially foam-free fluid coming from the tank can be recycled back as the washing fluid of the flue gas scrubber.

Thus, the purpose is not to prevent foaming, but to prevent it from cumulating in the desulphuration plant at places where it causes problems by disturbing the process or by taking up space. In the invention, foam is removed in a controlled manner after the scrubber in the flow direction of the washing fluid and it is directed to the desired place for further processing.

BRIEF DESCRIPTION OF THE DRAWINGS

In the following, the invention will be described in more detail with reference to the appended drawings, in which.

DETAILED DESCRIPTION OF THE INVENTION

Figure 1:
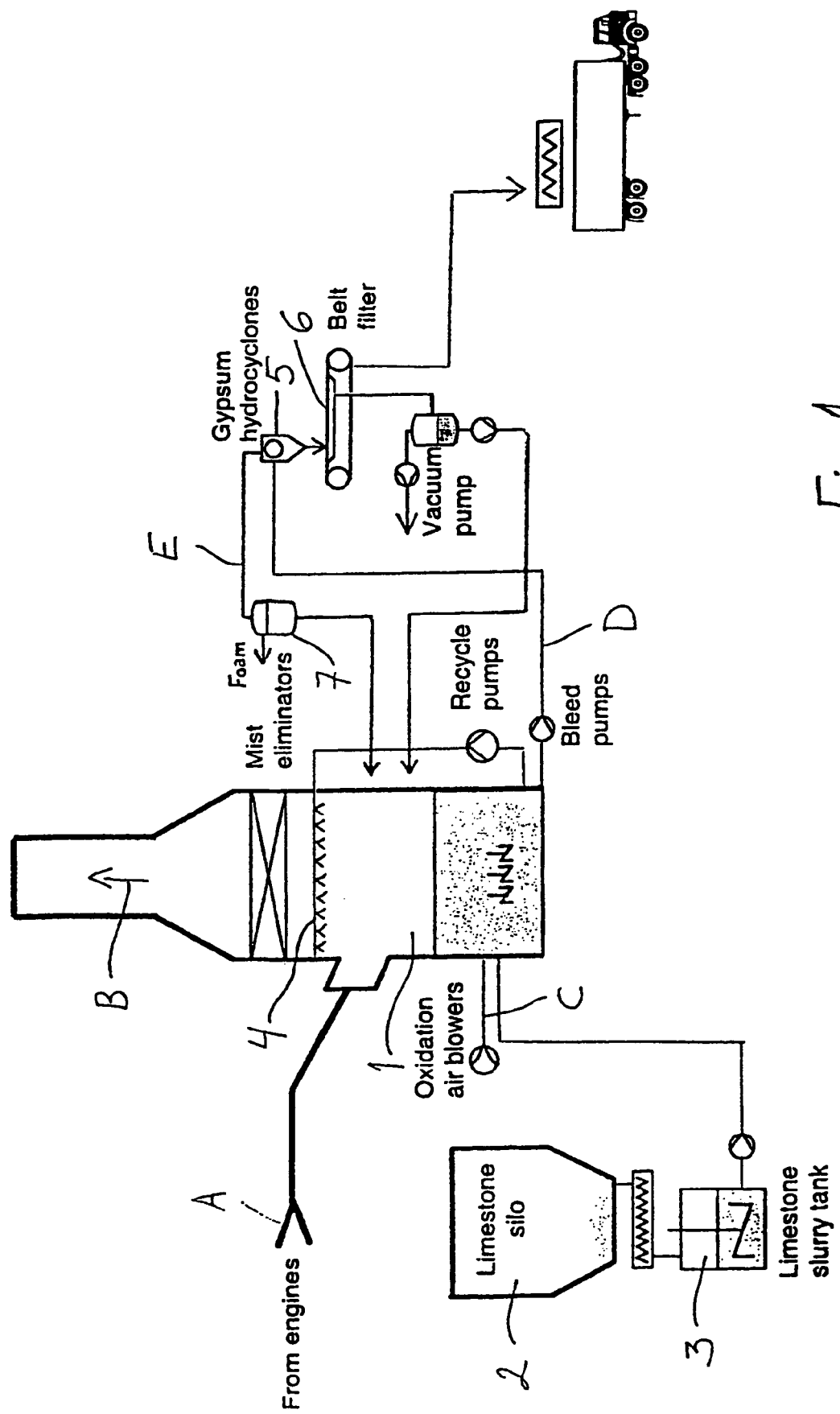
FIG. 1 shows a flue gas scrubber and material flows connected to it as a diagrammatic plan.

FIG. 1 shows the desulphuration plant for flue gases in a diesel power plant as a general process chart, which plant includes a gas scrubber 1, whose operating principle is known, to which the flue gases created in fuel combustion are directed from the diesel motors (arrow A) and from which the cleaned flue gases are directed away via a waste flue (arrow B). Here the gas scrubber 1 refers to an actual scrubber tower, where flue gases and washing fluid are put into contact with each other and in whose lower part the washing fluid accumulates. Gas scrubber 1 is a limestone-based scrubber. From limestone silo 2, limestone is supplied in a powdered form to the limestone slurry tank 3, from where it is pumped into the scrubber 1. Limestone slurry is recycled from the lower part of the scrubber 1 to nozzles 4, which are located above the inlet of flue gases and which form a spray zone, which scrubs the flue gases with a countercurrent principle. Calcium carbonate reacts with the sulphur compounds of flue gases by forming calcium sulphite, which oxidizes into calcium sulphate i. e. gypsum because of the oxygen coming in with flue gases and the forced oxidation taking place in the lower part of the scrubber. Oxidation air is supplied to the fluid volume in the lower part of the scrubber via line C. There is also a mixer in the lower part of the scrubber, the purpose of which is to mix oxidation air to the fluid volume. Gypsum slurry is formed on the bottom of the gas scrubber 1, which slurry is directed from the bottom of the scrubber via the waste line D to the separator 5. The separator is a hydrocyclone, whose substantially gypsum-free excess is directed back to the scrubber 1 via the recovery line E as washing fluid. Water is used as the carrier of the washing fluid, which water carries the materials used in the flue gas scrubbing process and formed in it. The waste line D and the recovery line E form a recycle line, the purpose of which is to create a water circulation as closed as possible in order to keep the need for fresh water as small as possible. The reject of the hydrocyclone, which is gypsum slurry, which has a high solid matter content, is directed to the belt filter 6, where water is further removed from the gypsum by filtering and from on top of which the gypsum cake is moved to further processing. The washing fluid received as filtrate from the belt filter can be further recycled to the scrubber 1.

The parts described above and their operations are known as such. Soot foam, which includes air, water and other materials that have come in with flue gases, is formed in the fluid in the lower part of the scrubber, especially due to the combined influence of oxidation air input, soot particles contained by the flue gases, lubricant solids and heavy mixing. In order to remove foam and to prevent foam cumulation, there is a tank 7 in the plant, wherein the foam that has separated as its own phase on the fluid surface can be separated from the fluid purely in a mechanical manner, and it is not necessary to use anti-foam agents to prevent foam cumulation. The tank is located in the recycling line of washing fluid after the separating point of separator 5 in the flow direction of the washing fluid. The tank 7 is an excess tank normally used in connection with a hydrocyclone, to which the excess of hydrocyclone is directed. Changes have been made in the excess tank in order to separate foam, which will be described hereinbelow.

With the arrangement in question it is possible to prevent the so-called soot foam accumulation in the process fluid of the desulphuration plant, especially in power plants based on diesel motors. The foam removed from the fluid can be directed among the gypsum separated in the separator 5 or it can be taken out as a separate material flow and be processed separately. The alternatives depend on, e.g., the desired purity of the gypsum produced by the plant and its purpose of use.

Figure 2:
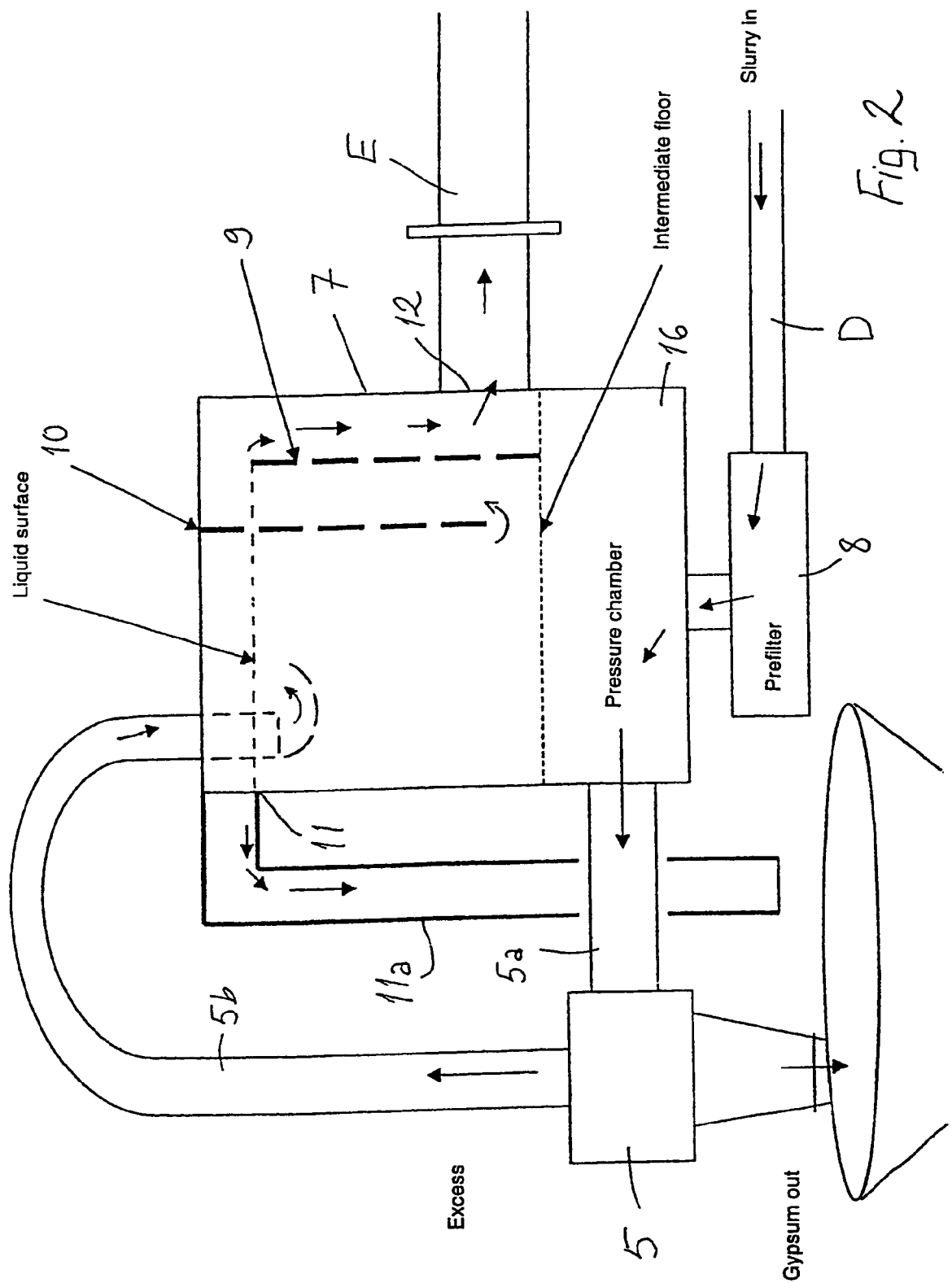
FIG. 2 shows an apparatus for separating foam according to the invention in more detail.

FIG. 2 shows in more detail the tank 7 for foam removal after the separating point in the separator 5 in the recovery line. In the case shown in the figure, there is in the direction of flow of the gypsum slurry first a prefilter 8 before the separator 5, from which filter the gypsum slurry is directed to the pressure chamber 16 and from there along the input pipe 5a to the separator. In the separator, the gypsum that is solid matter in water separates in a known manner as heavier and it falls into a reject funnel, which is in the beginning of the gypsum conveying line. From the separator, fluid is directed along the excess pipe 5b to the tank 7, which can be open or closed on top. The tank in FIG. 2 is the excess tank of a hydrocyclone, which is located on top of the pressure chamber 16. Tank 7 and the pressure chamber 16 below it are in the same container separated by an intermediate floor. The fluid coming from the separator 5 via the excess pipe 5b ends up below the fluid surface of tank 7. There is still a baffle at the end of the excess pipe 5b, which directs the fluid coming from the pipe upwards in order to separate foam well from it. Foam remains on top of the fluid surface of the tank and it can be removed as overflow and directed to the same gypsum conveyance line as the gypsum separated in the separator. In the figure foam is shown to be directed to the same reject funnel with the gypsum. However, foam can, when desired, be kept off from gypsum, if desired, and be handled separately. The fluid from which foam is separated is directed to the outlet 12 of the tank below the level of the fluid surface, via which outlet the washing fluid enters the recovery line E and the gas scrubber 1.

In connection with the hydrocyclone, it has been known to use an excess tank, to which the excess can be directed from the separating point of fluid and gypsum. In the following, the modifications to the structure of this type of an excess tank in order to use it for foam removal will be discussed. FIG. 2 shows baffle plates, which are placed in the tank 7 in such a manner that they extend vertically. The baffle plates are used to control the fluid surface and to prevent the foam separated onto the fluid surface from being carried with the fluid flow to the water outlet 12. The first baffle plate 9 extends from the bottom of the tank to a level, which determines the level of the fluid surface in the tank, and it separates the outlet 12 from the rest of the tank and from the fluid inlet. There is a second baffle plate 10 on the overflow 11 side of the first baffle plate 9, between whose lower end and the tank bottom there is a space for water to flow toward the first baffle plate 9 and the outlet 12. The underedge of the second baffle plate 10 is below the upper edge of the first baffle plate 9 and the upper edge extends so high that it is above the fluid surface and the foam layer, and thus maintains the foam on the other side from the first baffle plate 9. The baffle plates 9 and 10 thus force the water to flow down and up on a sinuous path before the outlet 12. When the first baffle plate 9 is attached to the tank, its upper edge is at the same time placed on such a height that by means of it, it is possible to control the fluid level at the correct level position in view of the overflow 11. The purpose is to get the fluid level a bit higher than the overflow 11 in order for the foam to be removed from the tank via the overflow on top of the outflowing water. A new part is also the overflow pipe 11a after the overflow, by means of which the foam can be directed to the desired place for further processing.

Figure 3:
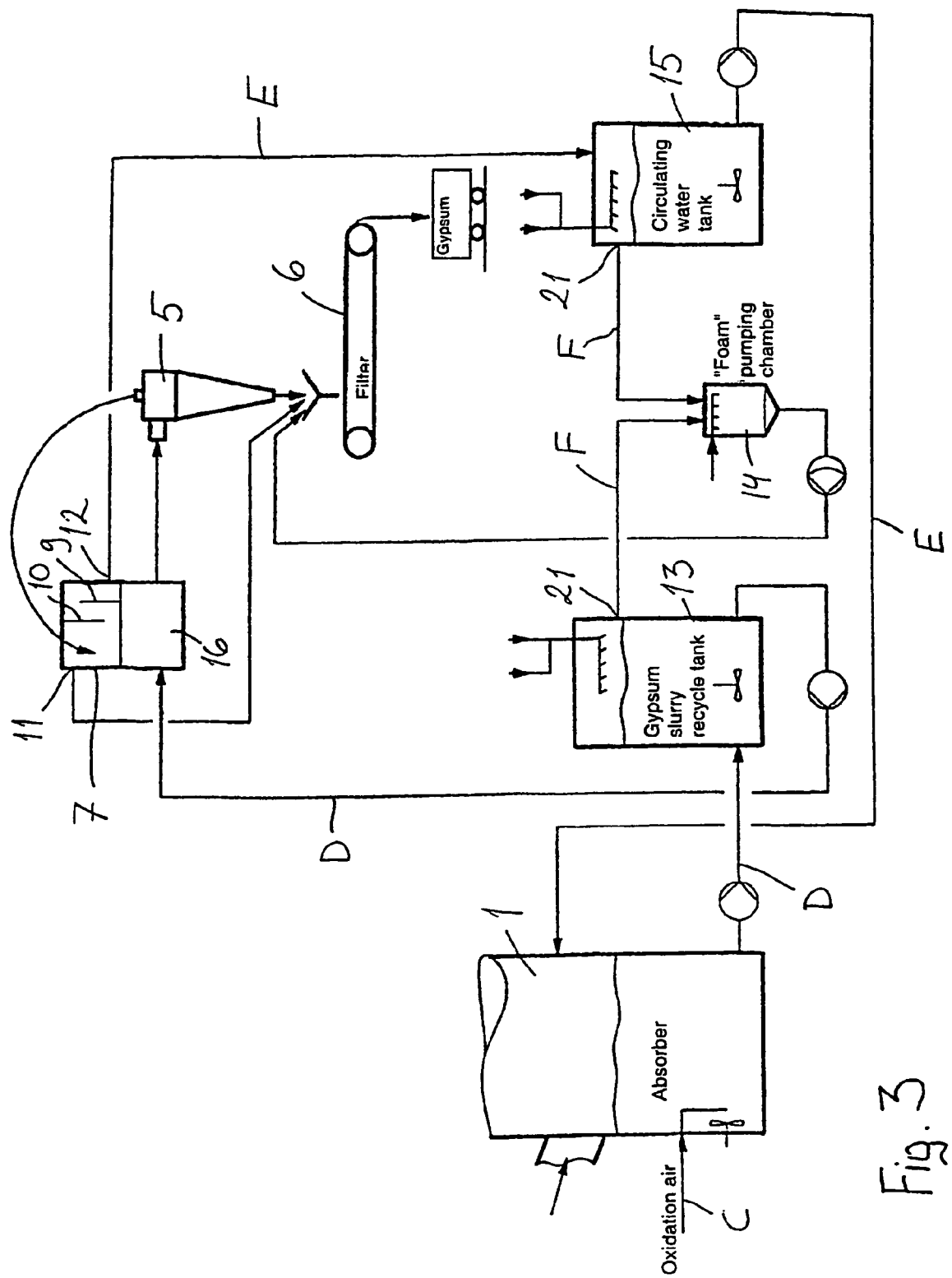
FIG. 3 shows an apparatus according to a second embodiment as a process chart.

FIG. 3 shows a chart according to the second alternative, wherein there are several foam removal points in the process fluid flow. Gypsum slurry is pumped from the bottom of the scrubber 1 as a continuous flow to the gypsum slurry recycle tank 13, where the fluid settles for the first time. Already at this point, most of the bubbles and the fluid form foam. In addition, there is a mixer in the gypsum slurry recycle tank, the purpose of which is to prevent the gypsum slurry from remaining in the bottom. From the surface of the recycle tank 13 foam can be directed by means of special air or water sprays via the overflow 21 and the foam removal line F to the foam slaking and pumping tank 14. The recycle tank 13 thus functions in the washing fluid recycle line as the first tank, from which foam can be removed. Foam removal takes place in this tank advantageously periodically. The recycle tank 13 is relatively large in its volume, and by adjusting the ratio of the input and output gypsum slurry flow, its fluid level can be raised, if necessary, close to the overflow 21, via which foam can be removed possibly by means of the above-mentioned sprays. In addition, a corresponding foam separation can also exist in the circulation water tank 15, to which the substantially foam-free fluid from the above-described tank 7 used in connection with the separator 5 is directed via the recovery line E. Also from this circulation water tank 15, the loam is directed to the foam slaking and pumping tank 14. In the foam slaking and pumping tank 14 the foam can be slaked with a water spray and possibly a small amount of a surface tension reducing agent can be added, in which case the particles in the foam, for example soot particles, mix better in the fluid formed from the foam. As can be seen in the figure, the foam in the tank 7 after the separator 5 is directed along with the gypsum, and in this case also the fluid from the foam slaking and pumping tank 14 can be directed in the same ways along with the gypsum, but it is also possible to process the foam separately.

Figure 4:
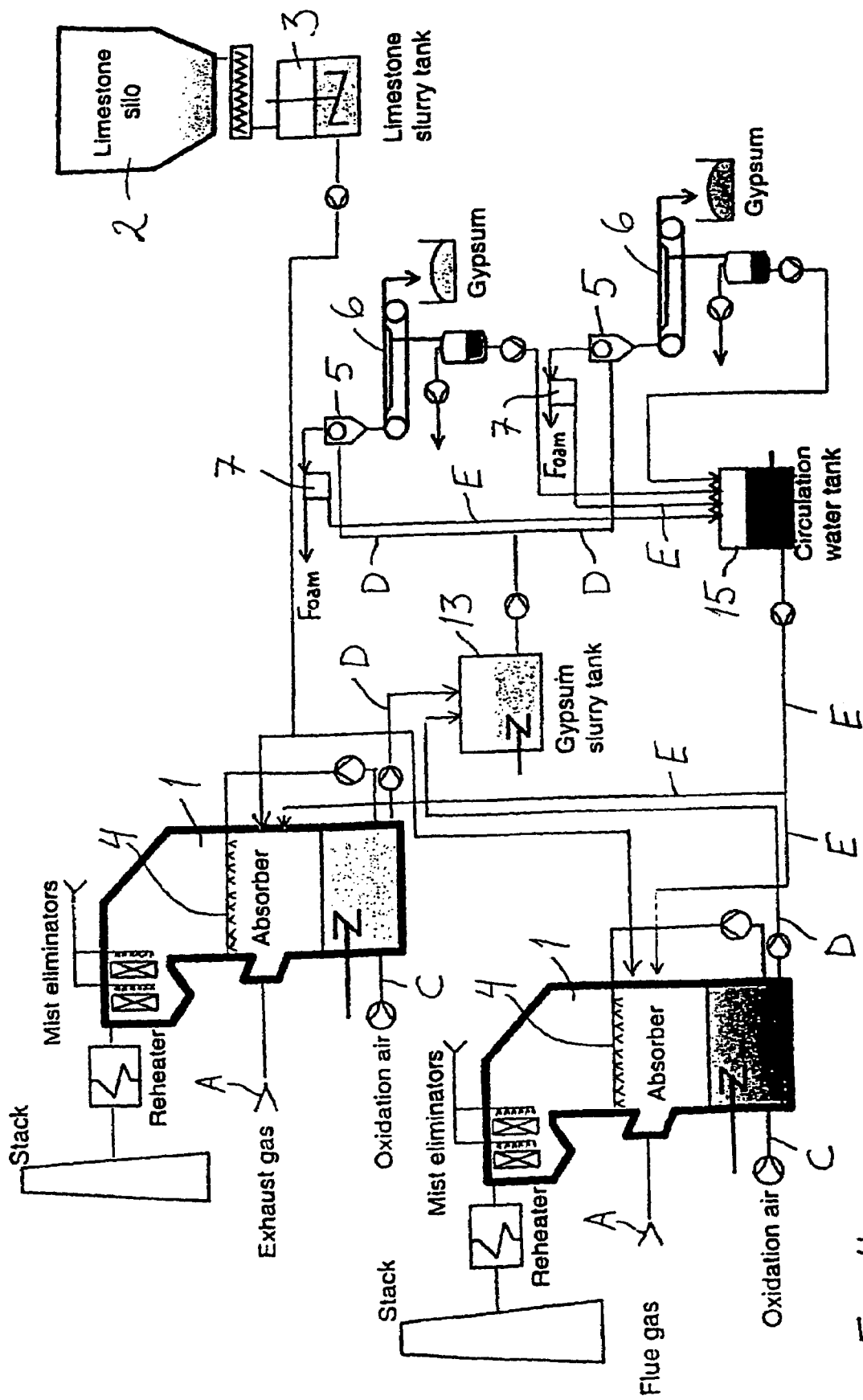
FIG. 4 shows an alternative with several gas scrubbers.

FIG. 4 shows a process chart, whose material flows correspond to those presented in FIG. 1. The difference here is that there are two flue gas scrubbers 1 in the plant, from both of which the gypsum slurry is gathered to the same recycle tank 13, from which it is directed to two different separators 5, in connection with both of which there can be the above-described tank 7 for foam removal. In the gypsum slurry recycle tank 13, the in connection with FIG. 3 described foam removal by means of air or water sprays can also exist. Also, it is possible that both scrubbers have a shared gypsum slurry recycle tank 13 and a shared separator 5, in connection with which there is the tank 7 according to FIG. 2 for foam removal.

Figure 5:
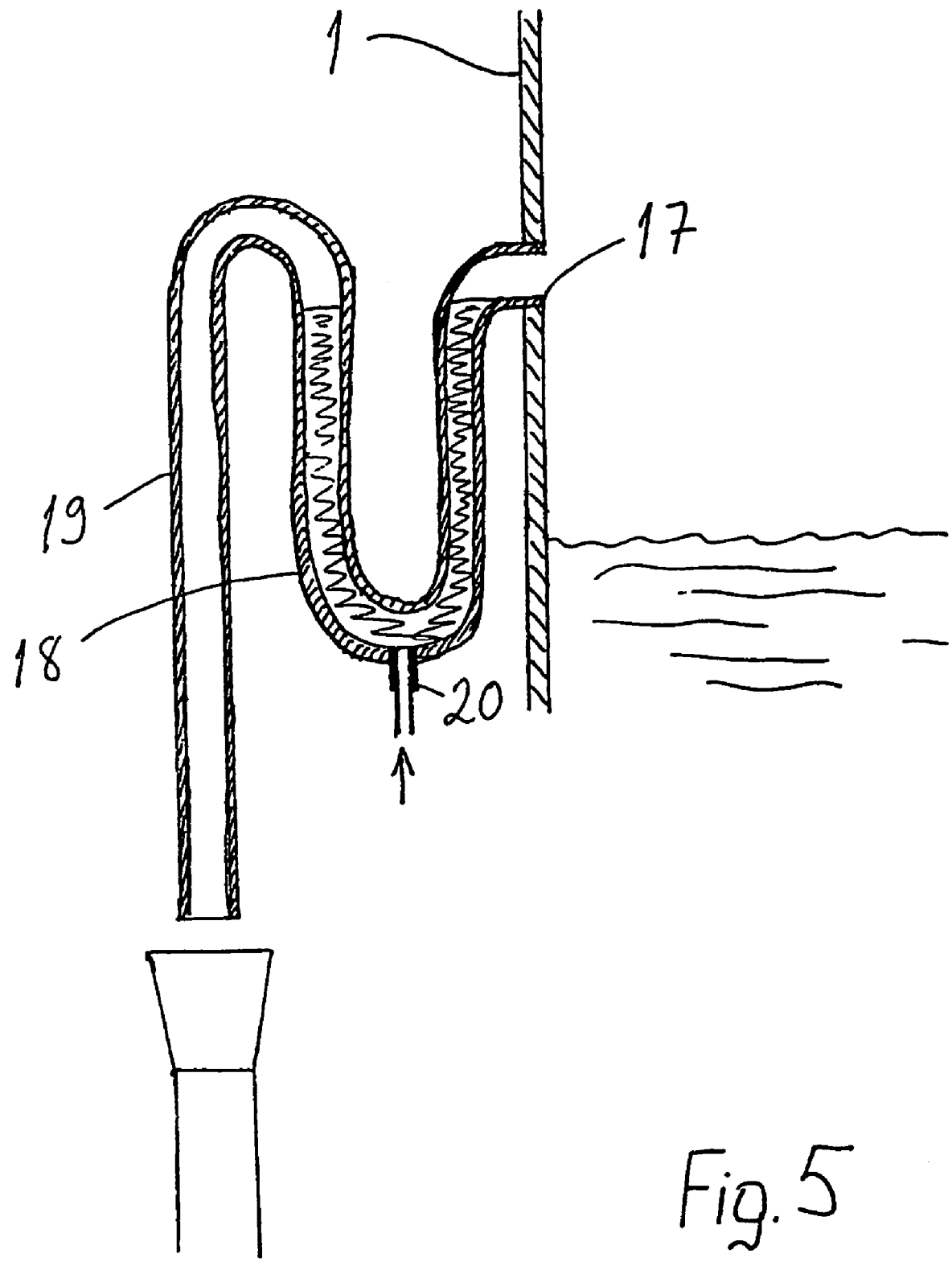
FIG. 5 shows an overflow tube used in connection with the scrubber.

FIG. 5 shows an overflow pipe arranged in connection with the gas scrubber 1, wherein there is a water seal 18, which prevents the break up of the internal gas pressure. The purpose of the overflow pipe is to remove the extra fluid from the scrubber when the surface of the fluid in its lower part has risen too high, for example in disturbance situations. It has been known in gas scrubbers to use an overflow pipe taken through the chamber wall, in which pipe there is an internal water seal, as which is functioning a pipe extending below the scrubber fluid surface. The internal water seal is in the solution of FIG. 1 been replaced with an external water seal 18 in such a manner that it is located outside the scrubber 1 chamber below the overflow point 17 as an U-shaped pipe, whose upright branch located the furthest from the overflow point extends above the overflow point 17. After this, there is a drain pipe 19, through which the extra fluid can flow out by means of gravity. A water connection 20 has been brought to the lower part of the water seal 18, through which water is continuously supplied in a small flow, the purpose of which is to maintain the fluid surface of the water seal 18 at the level of the overflow point 17 with a small overflow into the scrubber via the overflow point 17. The overflow point 17 opens inside the scrubber above the fluid level. In this manner it is possible to avoid foam accumulation in the water seal and its continuous gushing out from the scrubber via the overflow pipe, which has been a problem in those scrubbers, where the water seal is inside the scrubber as a pipe extending below the fluid level, which pipe is easily filled with foam. Thus it is possible to prevent the uncontrolled output of foam from the scrubber and to gather foam from the washing fluid flow directed outside the scrubber 1 via one or more tanks.

Even though the foam problems of flue gas washing fluids in diesel power plants have been discussed above, it can be used in all power plants using flue gas scrubbing processes with calcium-based absorbent, which processes have foaming problems because of the aeration required by forced oxidation. The term fluid or washing fluid used above refers more generally to water or a corresponding washing water, but the invention is applicable to be used in an analogous manner also in such systems, wherein the medium carrying different solids or dissolved components is some other fluid than water.

The invention claimed is:

1. A method for processing flue gas scrubber material flows, the method comprising:
    scrubbing in a flue gas scrubber flue gas with a washing fluid containing calcium-based absorbent to absorb sulphur oxides from the flue gas,
    directing a formed gypsum slurry from the flue gas scrubber to a separator, in whose separation point the gypsum is separated from the washing fluid, and from which the gypsum and washing fluid are taken out as separate material flows, and
    directing the washing fluid from the flue gas scrubber to a tank located before the separating point of the separator or after the separation point of the separator, in which tank foam is separated from the washing fluid as its own phase and taken out from the tank.

2. The method according to claim 1, wherein the foam is taken out from a fluid surface of the tank.

3. The method according to claim 2, wherein the foam is taken out as overflow.

4. The method according to claim 2, wherein in the tank the washing fluid is directed away from the foam towards its own outlet by means of a vertically extending baffle structures, which prevents direct horizontal flow of water.

5. The method according to the claim 1, wherein the foam taken out of the tank is combined with the gypsum material flow.

6. The method according to the claim 1, wherein the washing fluid is recycled from the tank back to the flue gas scrubber.

7. The method according to claim 6, wherein the washing fluid is directed from the tank back to the flue gas scrubber via at least one additional foam removal step.

8. The method according to the claim 1, wherein gypsum is separated from the washing fluid with a hydrocyclone, whose excess is directed to the tank, wherein foam is separated from the fluid.

9. An apparatus for processing flue gas scrubber material flows, the apparatus comprising:
    a flue gas scrubber using a washing fluid comprising a calcium-based absorbent,
    an outlet line for directing the gypsum-containing washing fluid out of the scrubber,
    a separator having a separation point for separating the gypsum and the washing fluid, and
    a tank arranged in a direction of flow of the washing fluid before a separation point of the separator or after the separation point of the separator, in which there are means for separating foam from the upper part of the tank and an outlet for removing clean washing fluid from foam.

10. The apparatus according to claim 9, wherein the means for separating foam comprises an overflow for directing the foam on a fluid surface of the tank away.

11. The apparatus according to claim 10, further comprising:
    one or more vertically extending baffle structures arranged in the tank between the overflow and the outlet.

12. The apparatus according to claim 11, further comprising:
    a first baffle structure located in the tank between said overflow and tank outlet, and directed from a bottom of the tank upwards defining the fluid surface level in the tank.

13. The apparatus according to claim 12, further comprising:
    a second baffle structure located in the tank between the first baffle structure and the overflow, and extending above the first baffle structure, and extends at the lower end to a distance from the bottom of the tank, thus leaving a flow outlet free for the fluid to flow towards the tank outlet.

14. The apparatus according to claim 11, wherein in the one or more baffle structures each comprise a baffle plate.

15. The apparatus according to claim 9, wherein the means for foam removal in the tank before the separating point of the separator comprises a spray device for directing the foam away from a tank fluid surface.

16. The apparatus according to the claim 9, further comprising:
another tank arranged after the tank following the separating point of the separator, the other tank comprising means for directing the foam away from the upper part of the tank and an outlet for removing clean washing fluid from the foam.

17. The apparatus according to the claim 9, further comprising:
an overflow pipe connected to the scrubber and comprising a water seal located outside the scrubber below the overflow point.

18. The apparatus according to claim 17, wherein in the water seal there is a water connection, through which water can be supplied to the water seal.

* * * * *